United States Patent Office 2,720,217
Patented Oct. 11, 1955

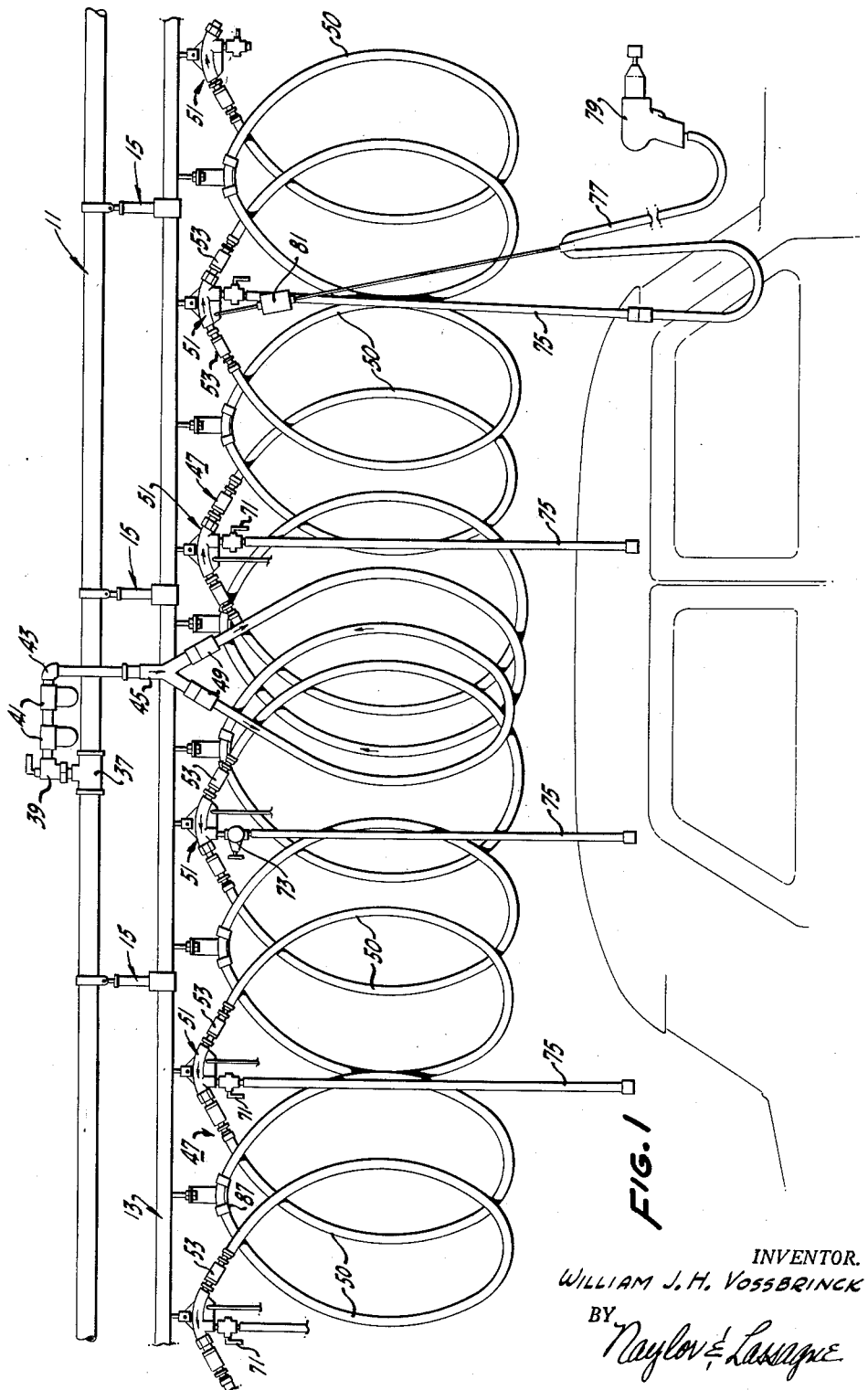

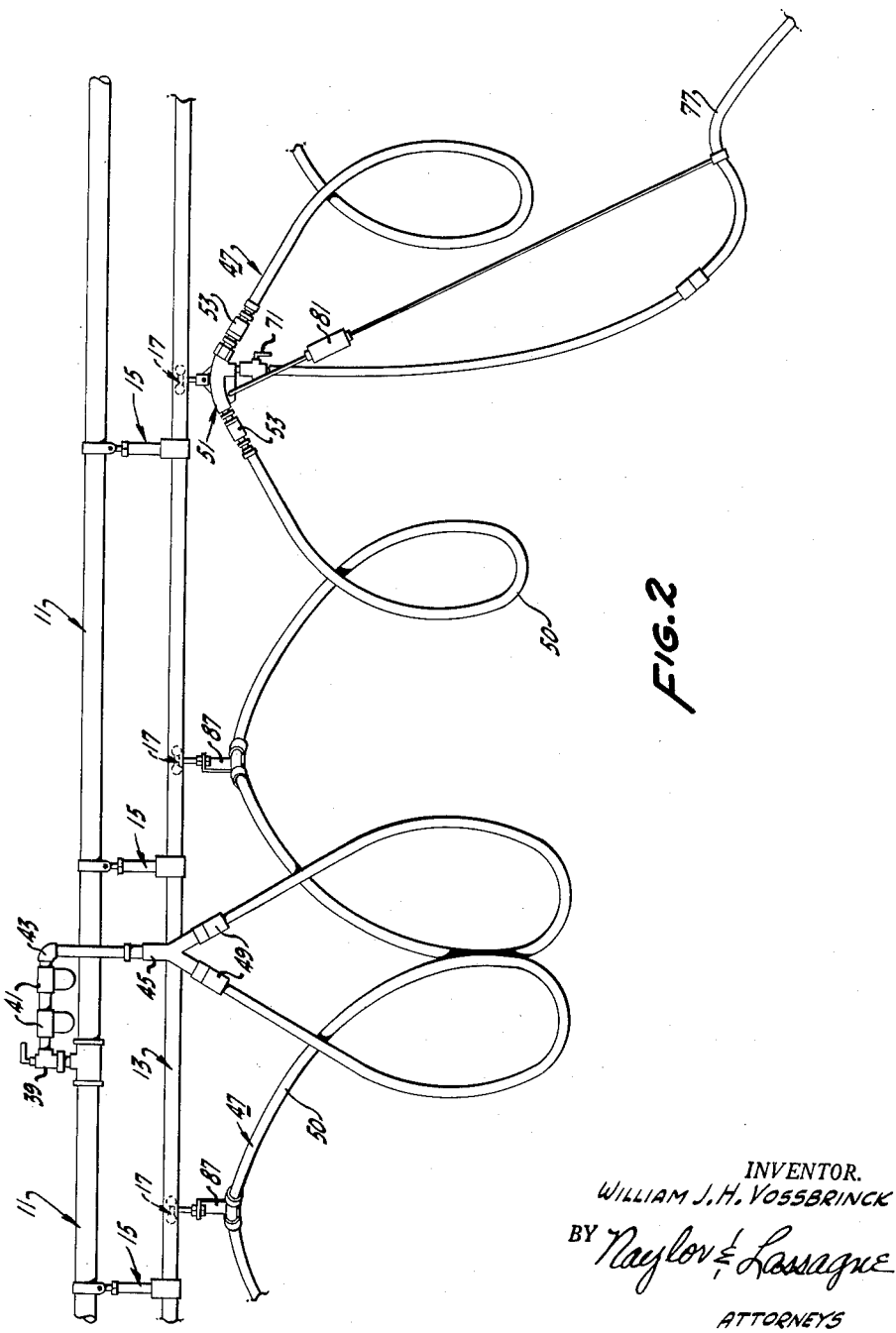

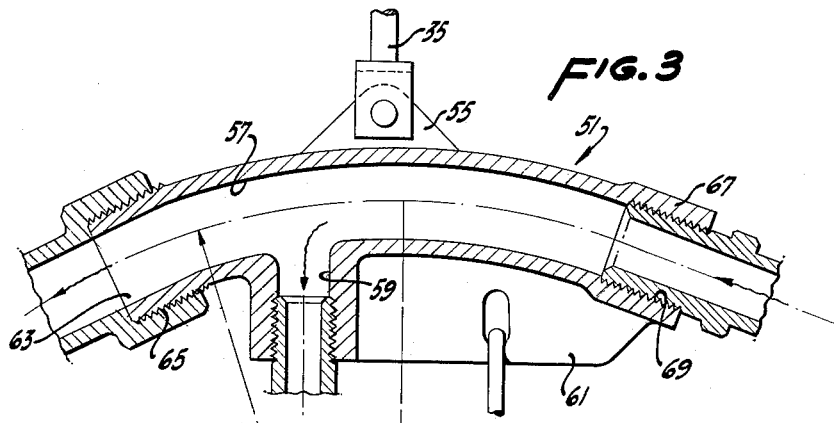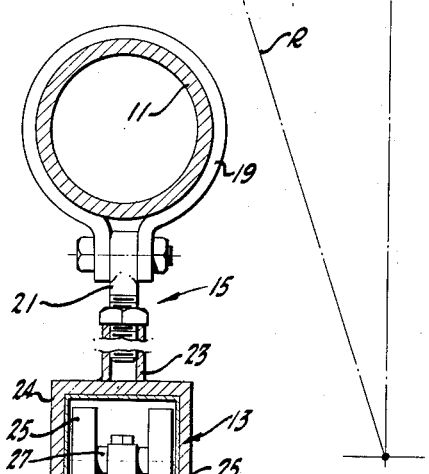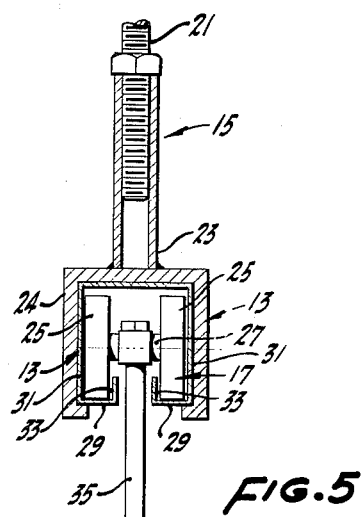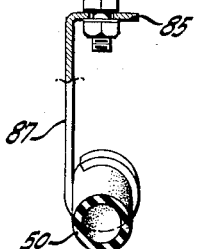
INVENTOR.
WILLIAM J.H. VOSSBRINCK
BY Naylor & Lassagne
ATTORNEYS

2,720,217

COMPRESSED AIR TRANSMISSION SYSTEM FOR PNEUMATIC TOOLS

William J. H. Vossbrinck, Los Gatos, Calif.

Application November 24, 1954, Serial No. 470,896

6 Claims. (Cl. 137—561)

This invention relates to fluid transmission systems generally, and more particularly to certain improvements in an air transmission or distribution system of the type employed to supply air under pressure to a plurality of air driven tools performing, in sequence, assembly line operations.

In modern assembly line production procedures, manufacturers commonly employ mechanical conveyors in the producing of parts and/or assemblies (hereinafter referred to simply as "assembly"), using along the line of production pneumatic tools and devices in the grinding, punching, riveting, screwdriving, drilling, nut running, and other operations performed on the assembly. As the assembly progresses in continuous movement through its manufacturing phases, each worker in performing a given operation or series of operations moves "downstream" with the conveyor and assembly, returning to his starting position "upstream" to repeat the performance as the next assembly is conveyed past the worker's station. The workers are usually in reasonably close proximity to each other, according to their stations, and each worker may use the same or different tool or series of tools in performing his particular operation.

To supply air under pressure for operating the tools, and to provide flexibility in their operation in moving with the conveyor and assembly, as above described, it has been the practice to provide along the length of the conveyor line, one or more air supply lines or "headers" usually supported directly on the floor adjacent the conveyor, which header in turn is attached to an air supply main. Stationary T fittings or air outlets are inserted in the line of the header at intervals corresponding to and with the stations, and the requirements of the tool or tools to be employed at each of such stations. To each T fitting there is then removably connected by means of a relatively long length of flexible hose one or more power tools, the length of each such flexible hose being determined by the time required to complete the operation and the relative movement of the assembly along the line of the conveyor during the performance of such operation. It is generally preferred that each tool and hose remain attached to its respective T fitting in the header for the entire performance of the operation required of the tool at its particular station: although it is frequently found in practice that due to the practical limitations in the length of an air hose which can be used, an operator will be required for one reason or another to disconnect the tool and move downstream in order to catch up with the assembly and complete the operation, again disconnecting the tool to move back upstream to its original station.

With such distribution systems there have been certain important disadvantages which have heretofore been generally considered as inherent and unavoidable, seriously detracting from the possible economic advantages which might otherwise be obtained in the use of air operated tools, as distinguished from the use of electric tools. Chief among such disadvantages is the fact that while air under pressure is basically a rather cheap source of power for the operation of the various tools, pressure losses are encountered in the distribution system between the supply main and the several tools, such that the air supply must either initially be made available in the main at a pressure substantially in excess of that actually required to the operation of the tools at their peak efficiency, or, if made available at the normal supply pressure (generally of the order of one hundred pounds gauge), the tools will be operated with air under such reduced pressure that the overall operating efficiency of the tool will be drastically reduced. Such pressure losses are known to be due primarily to both the rather long length of the supply hose of relative small I. D. required to the operation of the tool according to the movement of the assembly during the performance of the tool operation, and to turbulence in the header caused in the take-off through the T fitting, appreciably disturbing both the effective or static pressure head in the header as well as the velocity head in the hose.

Many attempts have been made to overcome or reduce the causes of such pressure losses as above encountered, as for example through the use of hose of larger I. D. to the disadvantage of the desired ease of manipulation of the hose and operation of the tool; by a shortening of the length of the hose for each tool to the further disadvantage of the operator in increasing the frequency with which he will be required to disconnect the tool, reconnecting it downstream to complete the operation, and again disconnecting the tool and reconnecting it back at its original station; and by other equally apparent means. None of such systems have however proved particularly satisfactory, and it is not uncommon for tools employed with such systems, designed to have a peak operating efficiency when air is supplied thereto under a pressure of ninety pounds per square inch, actually operating with air supplied from the main at one hundred pounds per square inch, at a pressure at the tool as low as sixty pounds per square inch, indicating a thirty pound loss in pressure and approximately a 50% reduction in the optimum power of the tool.

In accordance with the present invention, it has been found that through the provision of an improved means for "taking-off" air from the header of the distribution system, the header may be constructed in the form of a flexible conduit of relatively large I. D. which is adapted to be suspended from an overhead conveyor system in such a manner that for substantially all assembly line operations as to be performed by the pneumatic tools, the nonflexible hose of smaller I. D. connecting the tool through the take-off means may be relatively short in length: all to the end that the pressure drop occasioned under even the most demanding conditions of air supply is reduced to a point where it is of no appreciable significance.

Specifically, the present invention provides in an air distribution system of the above type a novel manifold connection for each tool to be used with the flexible line constituting the header: the manifold being so designed that as air is caused to flow through the header from the supply main to the several tools which may be operated simultaneously at a plurality of stations along a length of the conveyor line, the air supply required for all tools located downstream of any single manifold, connected in the series, will be caused to flow through the manifold in a smooth arcuate path, while the air to operate the tool for which the manifold serves as a take-off is taken from the inside or concave side of the said arcuate path. In this manner, the air flowing through the arcuate path of the manifold will, because of its velocity, be thrown to the outside or convex side of the arcuate path, permitting the take-off from the inside or concave side of the arcuate path with little disturbance to the main flow of air and turbulence in the manifold and thus with no appreciable decrease in the velocity head of the main air supply flowing through the manifold, or the pressure head at the take-off for the tool so supplied by the manifold.

In accordance with the foregoing novel feature, characteristic of the invention, it will be noted that the air distribution system made possible thereby will consist in certain novel features of construction, combination of parts, and in the unique relation of the various members and in the relative proportioning and disposition thereof, all as will be more completely outlined herein and defined with particularity in the appended claims.

To enable others skilled in the art fully to adapt the invention for various applications without omitting certain features that, from the standpoint of the prior art, fairly constitute essential characteristics of the generic or specific aspects of the invention, a preferred embodiment is disclosed in the annexed drawings, wherein like reference characters denote like parts throughout all the views, in which—

Figure 1 is a view in elevation showing a portion of an air distribution system constructed in accordance with a preferred embodiment of the invention;

Figure 2 is a view in elevation of a portion of the air distribution system shown in Figure 1, showing an extension of the header in movement with the assembly;

Figure 3 is an enlarged cross-sectional view through a portion of the header, showing a preferred embodiment of the manifold in detail;

Figure 4 is a cross-sectional view showing the arrangement including the suspension of the track from the supply main, and the trolley arrangement for the manifold, in detail; and Figure 5 is a cross-sectional view showing the arrangement between the trolley and track and an intermediate support for the header.

Having reference first to the general arrangement of the air distribution system shown in Figures 1 and 2 of the drawings:

11 is an air supply main which is conventionally secured to the ceiling or otherwise supported by a fixed structure above the conveyor line and preferably to one side thereof as to be positioned approximately above the stations corresponding to the movement of the assembly line workers in moving with the assembly in the performance of their operations.

A channel or track 13 is suspended from the air main 11 by means of the hangers 15 which are adjustable in length to properly fix the track 13 in a substantially horizontal plane, and supported by the track 13 are a plurality of movable carriages 17. As shown in detail in Figures 4 and 5, the hangers 15 include a strap 19 which is clamped about the main 11, and a turnbuckle of which the threaded rod 21 is pivotally connected to the strap 19 and the internally threaded tube 23 is welded or otherwise secured to the top of the bracket 24 within which is supported the track 13.

In accordance with the foregoing arrangement, it will of course be apparent that other means may be provided for the support of the track, as directly to the ceiling or by means of other fixed structure, all of which may be considered as conventional to movable overhead carriage systems generally.

The movable carriage 17 may be of any well known form of construction but preferably consists of a pair of spaced wheels 25 which are mounted on an axle 27 as to ride within and on the horizontal bottom portions 29 between the sides 31 thereof and the upturned flanges 33. From the center of the axle 27 there is a depending rotatable rod generally designated as 35, arranged at its bottom end to be engaged by and to support parts of the header of the air distribution system at either a point of take-off or at an intermediate mid-point, as will be described in detail hereinafter.

Coming now to the distribution means for the air under pressure supplied from the main 11, for each of the distribution systems to be operated along the length of the assembly line there is inserted in the main 11 a T fitting 37 located to correspond approximately to the mid-point of the length of the assembly line to be served. Connected in series by pipe with the take-off of the T 37 is a shutoff valve 39 and, since the system illustrated is but a portion of a lengthy air distribution system made possible according to the present invention, a filter-lubricator set 41. An elbow 43 is connected with the second of the filter-lubricator set 41 and to the depending Y fitting 45. With reference to the several members from the T fitting 37 to the Y fitting 45, it is important to note that the internal diameter of the air passages through the same, as well as that of the pipe connecting the same, should be relatively large to prevent turbulence and pressure drop when a full demand is made of the air to be supplied by the distribution system served thereby.

Two headers are connected to the outlets of the Y 45, which is preferably of the "quick-disconnector" type. As shown, the two headers, generally indicated as 47, each have quick disconnect couplings 49 and include flexible hose sections 50 connected in series by the manifolds, generally designated as 51; the several hose sections 50 being connected to the respective manifolds 51 by the quick disconnect coupling arrangements 53.

It is in the header that the present invention, in part, makes possible an air distribution system which is well adapted to make available from the supply main air under pressure suitable to the operation of the air tools at their peak efficiency whether operated singularly or simultaneously, with no appreciable pressure drop between the main and the tool. Accordingly, there is provided in the header a take-off manifold for each of the air tools to be served by the header, shown in detail in Figure 3. The manifold 51 may be formed as by casting or in any suitable manner to provide a top web 55, an arcuate passage 57, a take-off passage 59, and a bottom web 61. The body portion of the manifold in which is formed the arcuate passage 57 is provided at its one end 63 with screw threads which are engaged by the internally threaded end 65 of one side of the quick disconnecting coupling arrangement 53; and at its other end 67 with internal threads which are engaged by the externally threaded end 69 of one side of the corresponding quick disconnect coupling arrangement 53. If preferred, the foregoing arrangements of the pipe threads may be reversed, or same threads may be formed on each end 63, 67; limited only that there be provided a clean substantially unrestricted flow passage through the manifold, as shown.

In accordance with the particular arrangements shown in approximate scale in Figure 3, the passage 57 is formed on a radius R of 10" measured to its center line, it having been found that under average conditions of demand and distribution, and design as to internal diameters of the main passages of flow through the header, an arcuate passage so formed will permit a take-off of air from the inside (or concave side) through the passage 59 with substantially no interference due to turbulence to flow, and loss in velocity head in the header and/or hose, or in the static pressure head in the take-off line. When but a single tool is being operated, the radius of the passage 57, aforedescribed, will have little importance; but when a plurality of tools are being operated simultaneously, supplied from the header, it is understood that the radius R should be so selected that under average conditions of flow (and air velocity) in the passage 57, the air will be "thrown" outwardly against the outer concave face of the passage such that there will be little appreciable "skin effect" on the flow along the inside concave surface and/or turbulence when air is caused to be taken off through the passage 59. Under most conditions of demand, according to the modern assembly line requirements where air is supplied from a main at approximately one hundred pounds pressure, a radius R of approximately 10" will prove a satisfactory mean average.

Connected by means of a suitable pipe fitting to the take-off passage 59 of the manifold, there is preferably a valve 71, or according to the particular needs of the tool to be served therefrom a pressure regulator 73 (see Figures 1 and 2, and connected to such valve there is a flexible hose 75 having at its lower end one coupler element of a quick disconnect shut-off coupling arrangement, which is preferably positioned slightly above the head of the worker. To the flexible hose 75 there is then connected the hose 77 of the air tool 79, the hose 77 being provided with the mating coupler element completing the quick disconnect coupling arrangement. While but one tool is shown in Figure 1, it will of course be understood that other tools may be attached to the others of the flexible hoses 75, corresponding to the several operations to be performed by several tools operated by either the same operator or other operators at the represented single station.

For maintaining the hose 77 of the tool 79 out of the operator's way as the tool is being used, or when not in use, a reel type spring balancer 81 may be employed of any of several well known types, connected as shown to the bottom web 61 of the manifold (see Figure 3 for detail) and to an intermediate and preferably mid-point of the tool hose 77. Suitable means (not shown) may also be employed on the lower hose clamp of the balancer arrangement, engageable with the tool 79 when not used to maintain the same in a readily available position.

Since in accordance with one of the principal features according to the present invention portions of the header are to be expanded (or contracted) in effective length to correspond to movement of the operator or operators downstream in the performance of their assembly line operations, the flexible sections of hose 49 of the header are so supported as to be either coiled or looped back, or to be extended. To this purpose, the carriages 17 alternately support the manifolds and intermediate or mid-portions of the hose sections 50.

As shown in detail in Figures 3 and 4, the connecting support of the rod 39 is to the top web 55 of the manifold, the arrangement being such that the manifold is permitted rotational and limited free swinging movement in a vertical plane. As shown in detail in Figure 5, the connecting support of the rod 35 is to the top flange 85 of the clamping strap 87, the arrangement being such that the strap 87 is axially pivotable about the longitudinal axis of the rod 35.

By means of the two above such supporting arrangements, it will be observed from Figures 1 and 2 that the pivotal support of the successive manifolds 51 will cause the respective end portions of each of the connected intermediate hose sections 49 to be directed at all times substantially in a downward direction while the rotatable but non-swingable intermediate supports for the mid-points of the hose section 49 will permit the respective divided sections of the hose 49 between the intermediate carriage and manifold carriage to swing either in or out as the two such carriages are moved towards and away from each other; and thus to become extended or relieved without kicking as the operators move with the assembly in the performance of their operations, and then return to their initial positions to repeat on the next assembly.

In accordance with the foregoing description of the invention, it will be seen that the invention resides particularly in the novel manifold means and arrangement in the header permitting the take-off of air therefrom for the operation of the pneumatic tools without occasioning pressure losses as heretofore encountered, and in the novel position and arrangement of the manifold in the header and the associated carriages therefor whereby the air distribution system is provided with a degree of flexibility permitting progressive movement thereof as the operator or operators perform their operations to the assembly at the respective station or stations, all without causing the hoses of the several tools from becoming entangled with the hose of other tools, interfering with other operators, and creating a safety hazard.

Without further analysis the foregoing will so fully reveal the gist of the invention that others can by applying current knowledge readily adapt it to the demands of various applications without omitting certain features that, from the standpoint of the prior art, fairly constitute essential characteristics of the generic or specific aspects of the invention, and therefore such adaptations should and are intended to be comprehensive within the meaning and range of equivalency of the following claims.

I claim:

1. In an air distribution system of the type described including a header connected to an air supply main and a plurality of take-off hoses arranged to be connected to said header to supply air under pressure therefrom for the operation of pneumatic tools: the improvement comprising a manifold connected in the header as an air take-off for the hose of the pneumatic tool, said manifold being characterized by an arcuate passageway formed therein and arranged to be connected in the main path of flow of air through the header and a take-off passageway formed therein in communication with the said arcuate passageway and arranged to be connected to the take-off hose for the air tool, said two such passages being so designed and arranged with respect to each other that air caused to be taken-off through the said take-off passageway from the main body of air supplied through the said arcuate passage and header to the operation of a tool will be free from any appreciable turbulent effects and drop in pressure in both the flow of air through the header for the simultaneous operation of other tools supplied therefrom, and the flow of air through the take-off passageway and connected hose to the operation of the air tool so supplied.

2. In an air distribution system of the type described including a header connected to an air supply main and a plurality of take-off hoses arranged to be connected to said header to supply air under pressure therefrom for the operation of pneumatic tools: the improvement comprising a separate manifold connected in the header as an air take-off to singularly serve a pneumatic tool, said manifold being characterized by an arcuate passageway formed therein and arranged to be connected in the main path of flow of air through the header, and a take-off passageway formed therein in communication with the said arcuate passageway at a point on the concave side thereof and arranged to be connected to the hose for the pneumatic tool to be served by the manifold.

3. The manifold according to claim 2 wherein the flow axis of the air flowing through the take-off passageway from the arcuate passageway is in the same plane formed by the flow axis of the air flowing through the arcuate passageway in the simultaneous operation of other pneumatic tools served by the header.

4. An air distribution system of the type described for the assembly line operation of a plurality of pneumatic tools said system comprising a track arranged above the assembly line and extending in a substantially parallel direction thereto over the stations of the assembly line workers, an air supply main, an expandable and retractable air header system including sections of flexible hose connected in series with manifolds each of which is adapted to serve as an air take-off means for the operation of a pneumatic tool, each said manifold being characterized by an arcuate passage formed therein adapted to be connected in series with the two respective flexible hoses connected to the manifold and a take-off passageway formed therein in communication with the said arcuate passageway at a point away from the convex side of such arcuate passageway, means connecting the header with a source of air supplied under pressure, means including a flexible hose adapted to be connected with the said take-off passageways of the manifolds to supply air under pressure from the header to the pneumatic tools, and a plurality of movable carriage means operable in the said track and adapted and arranged to so support the header at each of the manifolds and at intermediate points along the connecting flexible hose sections between respective manifolds that the said respective portions of the connecting flexible hose sections between the movable carriage means for a manifold and the next adjacent movable carriage means for the intermediate point along the said connecting flexible hose section will be caused to become looped in a downward direction back upon itself without kinking when two said carriage means are moved to close proximity to each other in the track.

5. The air distribution system according to claim 4 wherein the several movable carriage means individually supporting each manifold are each arranged and constructed to permit the respective manifold so supported to swing in a substantially vertical plane in the line of movement provided between the carriages and the track and to be freely rotatable throughout such swinging movement, and the movable carriage means individually supporting each of the said connecting hose sections are each arranged and constructed to permit the said intermediate portion of the flexible hose section so supported to be rotated about a vertical axis.

6. The air distribution system according to claim 5 wherein the said sections of connecting flexible hose of the header are supported as aforesaid by the movable carriage means at their approximate mid-points, whereby the portions of the said flexible hose between the several respective points of support will be caused to form in substantially equal overlapping loops back upon themselves, as the pair of movable carriage means for successive manifolds are moved together in the track, with the intermediate movable carriage means supporting the connecting flexible hose positioned midway between the said pair of movable carriage means when moved to their closest respective positions, whereby there will be provided throughout the length of the header a smooth continuous path of flow permitting a take-off of air through the respective take-off passages of the said manifolds, without turbulent effect and resultant pressure loss in the system between the source of supply thereto and the pneumatic tools operated therefrom, and without regard to the respective extended or relieved form of the header.

No references cited.